US009773452B2

(12) United States Patent
Nishimura et al.

(10) Patent No.: US 9,773,452 B2
(45) Date of Patent: Sep. 26, 2017

(54) EL DISPLAY APPARATUS HAVING A CONTROL CIRCUIT FOR PROTECTION OF A GATE DRIVER CIRCUIT

(71) Applicant: JOLED INC., Tokyo (JP)

(72) Inventors: Masaru Nishimura, Kanagawa (JP); Toshiyuki Kato, Tokyo (JP); Hirofumi Nakagawa, Tokyo (JP)

(73) Assignee: JOLED INC., Tokyo (JP)

( * ) Notice: Subject to any disclaimer, the term of this patent is extended or adjusted under 35 U.S.C. 154(b) by 0 days.

(21) Appl. No.: 14/904,741

(22) PCT Filed: Jun. 12, 2014

(86) PCT No.: PCT/JP2014/003127
§ 371 (c)(1),
(2) Date: Jan. 13, 2016

(87) PCT Pub. No.: WO2015/008424
PCT Pub. Date: Jan. 22, 2015

(65) Prior Publication Data
US 2016/0163264 A1    Jun. 9, 2016

(30) Foreign Application Priority Data

Jul. 18, 2013    (JP) ................................ 2013-149908

(51) Int. Cl.
*G09G 3/30*    (2006.01)
*G09G 3/3258*    (2016.01)
(Continued)

(52) U.S. Cl.
CPC ......... *G09G 3/3258* (2013.01); *G09G 3/3266* (2013.01); *H05B 33/08* (2013.01);
(Continued)

(58) Field of Classification Search
CPC .. G09G 3/3266; G09G 3/3258; Y02B 20/325; H05B 33/08
(Continued)

(56) References Cited

U.S. PATENT DOCUMENTS 6,504,520 B1    1/2003    Osada et al.
7,215,314 B2    5/2007    Noguchi et al.
(Continued)

FOREIGN PATENT DOCUMENTS

JP    2000-122611    4/2000
JP    2004-118014    4/2004
(Continued)

OTHER PUBLICATIONS

Search Report from PCT/JP2014/003127, mail date is Sep. 16, 2014.

*Primary Examiner* — Adam J Snyder
(74) *Attorney, Agent, or Firm* — Greenblum & Bernstein, P.L.C.

(57) ABSTRACT

An EL display apparatus includes: gate driver ICs (i. e., gate driver circuits); a plurality of pixels; gate signal lines each transmit a selection voltage for selecting a pixel from the pixels and non-selection voltage for placing a pixel in a non-selection state; and TCON. The pixels each include: a driving transistor; an EL element; a first switching transistor; and a second switching transistor. The gate driver ICs each include scanning and outputting buffer circuits which are connected to TCON to which an output signal of each of the scanning and outputting buffer circuits is inputted.

4 Claims, 16 Drawing Sheets

(51) Int. Cl.
  *H05B 33/08* (2006.01)
  *G09G 3/3266* (2016.01)
  *G09G 3/10* (2006.01)

(52) U.S. Cl.
  CPC ............ *G09G 2300/0871* (2013.01); *G09G 2310/0286* (2013.01); *G09G 2310/0291* (2013.01); *G09G 2310/068* (2013.01); *G09G 2320/0223* (2013.01); *G09G 2320/0233* (2013.01); *G09G 2320/041* (2013.01); *G09G 2330/045* (2013.01); *G09G 2330/08* (2013.01); *Y02B 20/325* (2013.01)

(58) Field of Classification Search
  USPC .............................. 345/76; 315/169.1, 169.3
  See application file for complete search history.

(56) References Cited

U.S. PATENT DOCUMENTS

| | | | |
|---|---|---|---|
| 8,305,309 B2 | 11/2012 | Tomida et al. | |
| 8,587,566 B2 | 11/2013 | Ono et al. | |
| 8,847,941 B2 | 9/2014 | Tanaka et al. | |
| 2004/0061693 A1 | 4/2004 | Noguchi et al. | |
| 2004/0207612 A1* | 10/2004 | Moon | G09G 3/22 345/204 |
| 2006/0001621 A1 | 1/2006 | Ono et al. | |
| 2006/0066536 A1* | 3/2006 | Ota | G09G 3/325 345/76 |
| 2006/0114196 A1* | 6/2006 | Shin | G09G 3/3233 345/76 |
| 2007/0075954 A1* | 4/2007 | Oh | G09G 3/3258 345/92 |
| 2008/0136756 A1* | 6/2008 | Yeo | G09G 3/3677 345/87 |
| 2008/0143650 A1 | 6/2008 | Tomida et al. | |
| 2009/0121984 A1* | 5/2009 | Yamamoto | G09G 3/3233 345/76 |
| 2009/0219234 A1* | 9/2009 | Yamamoto | G09G 3/3233 345/76 |
| 2011/0234574 A1* | 9/2011 | Tanaka | G09G 3/2096 345/211 |
| 2013/0002642 A1 | 1/2013 | Tomida et al. | |
| 2014/0168282 A1* | 6/2014 | Mun | G09G 3/3266 345/690 |
| 2014/0204004 A1 | 7/2014 | Tomida et al. | |

FOREIGN PATENT DOCUMENTS

| | | |
|---|---|---|
| JP | 2006-011095 | 1/2006 |
| JP | 2007-241028 | 9/2007 |
| JP | 2008-152096 | 7/2008 |
| JP | 2009-003155 | 1/2009 |
| JP | 2010-107933 | 5/2010 |
| JP | 2012-058351 | 3/2012 |

* cited by examiner

EL DISPLAY APPARATUS HAVING A CONTROL CIRCUIT FOR PROTECTION OF A GATE DRIVER CIRCUIT

TECHNICAL FIELD

The present invention relates to an electroluminescence (EL) display apparatus including a display screen in which pixels are arranged in a matrix.

BACKGROUND ART

An EL display apparatus includes gate signal lines of various types formed on each pixel. Furthermore, various types of power supplies are used. For that reason, Patent Literature (PTL) 1 discloses a configuration in which a gate driver integrated circuit (IC) is disposed on the right side and the left side of a display screen.

CITATION LIST

Patent Literature

[PTL 1] Japanese Unexamined Patent Application Publication No. 2006-11095

SUMMARY OF INVENTION

Technical Problem

The present invention provides an EL display apparatus capable of preventing damage of a circuit such as a gate driver and abnormal heating in a panel.

Solution to Problem

An EL display apparatus according to an aspect of the present disclosure is an electroluminescence (EL) display apparatus of an active matrix type which includes a display screen in which pixels are disposed in a matrix. The EL display apparatus includes; a source driver circuit which outputs a video signal to be applied to the pixels; a source signal line which transmits the video signal output by the source driver circuit; a gate driver circuit; and a first gate signal line and a second gate signal line each of which transmits a selection voltage for selecting a pixel from the pixels and a non-selection voltage for placing a pixel in a non-selection state, wherein the pixels each include: a driving transistor; an EL element; a first switching transistor disposed in a pathway of current which flows through the EL element; and a second switching transistor which applies the video signal to the driving transistor, the gate driver circuit includes: a first scanning circuit and a second scanning circuit, the first gate signal line is connected to a gate terminal of the first switching transistor, and the second gate signal line is connected to a gate terminal of the second switching transistor. The EL display apparatus further includes a control circuit for exchanging a signal with the gate driver circuit and the source driver circuit, the first scanning circuit and the second scanning circuit are connected to the control circuit, and an output signal of each of the first scanning circuit and the second scanning circuit is inputted to the control circuit.

Advantageous Effects of Invention

According to the present invention, it is possible to provide an EL display apparatus capable of preventing damage of a circuit such as a gate driver and abnormal heating in a panel.

DESCRIPTION OF EMBODIMENTS (Underlying Knowledge Forming the Basis of the Present Disclosure)

Underlying knowledge forming the basis of the present disclosure is described below prior to describing details of the present disclosure.

An active-matrix (hereinafter occasionally abbreviated to AM) EL display apparatus including EL elements arranged in a matrix has been adopted to a display panel such as a smartphone and commercialized. The EL element includes an EL layer between an anode electrode and a cathode electrode.

The EL element emits light as a result of receiving current or a voltage supplied to the anode electrode (terminal) and the cathode electrode (terminal). At present, a compact EL display apparatus is mainly produced in high volume. However, a large EL display apparatus is under development by each manufacturer with a view to be a replacement for a television set.

Such a large display generally receives a heavier load on a panel than a small display. In particular, when a large display is used for high-resolution exceeding a full high vision (i.e., full high definition: FHD), waveforms applied to the panel tend to become dull.

Figure 1:
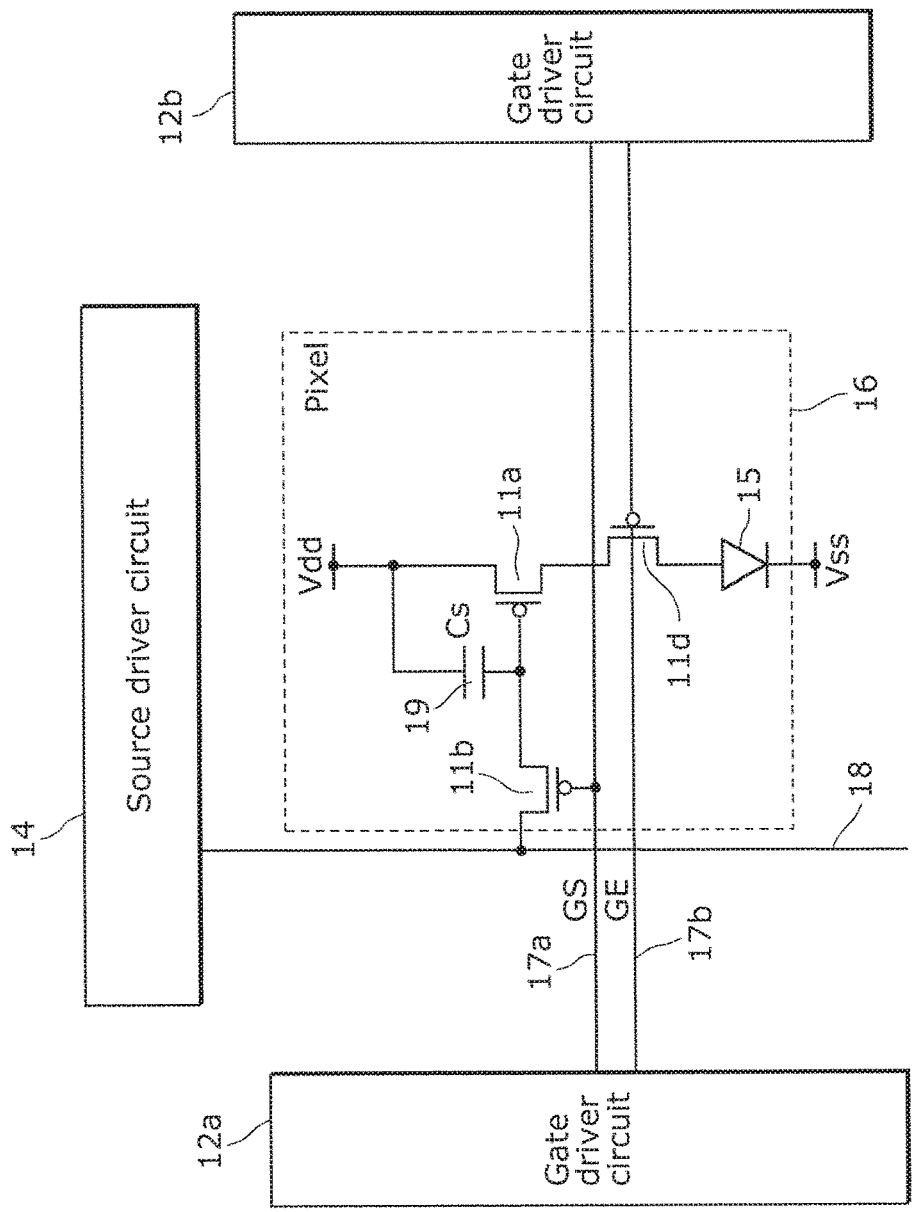
FIG. 1 is a circuit diagram illustrating a configuration of a pixel included in an EL display apparatus according to Embodiment 1.
Figure 2:
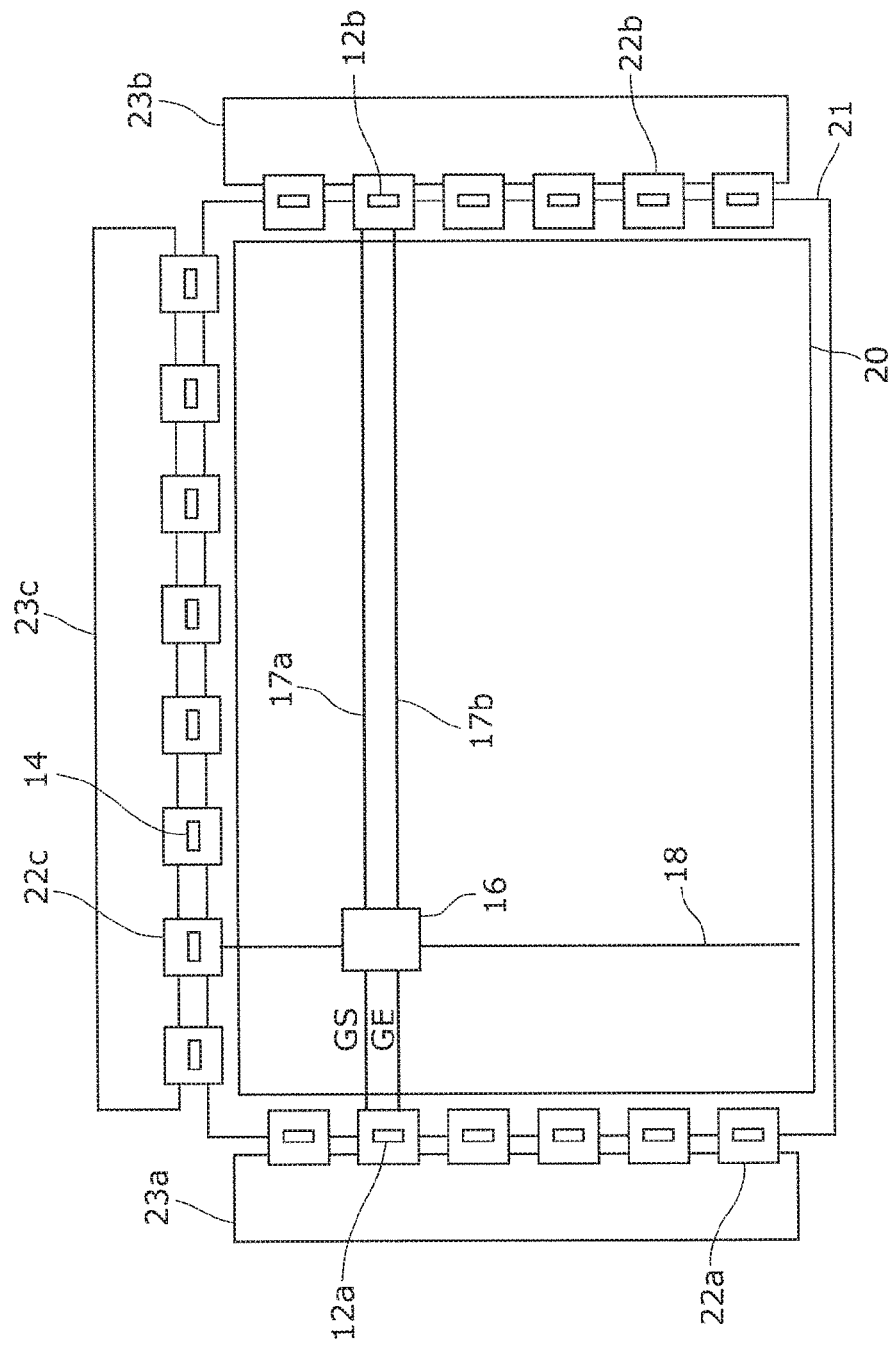
FIG. 2 is a configuration diagram of the EL display apparatus according to Embodiment 1.
Figure 3:
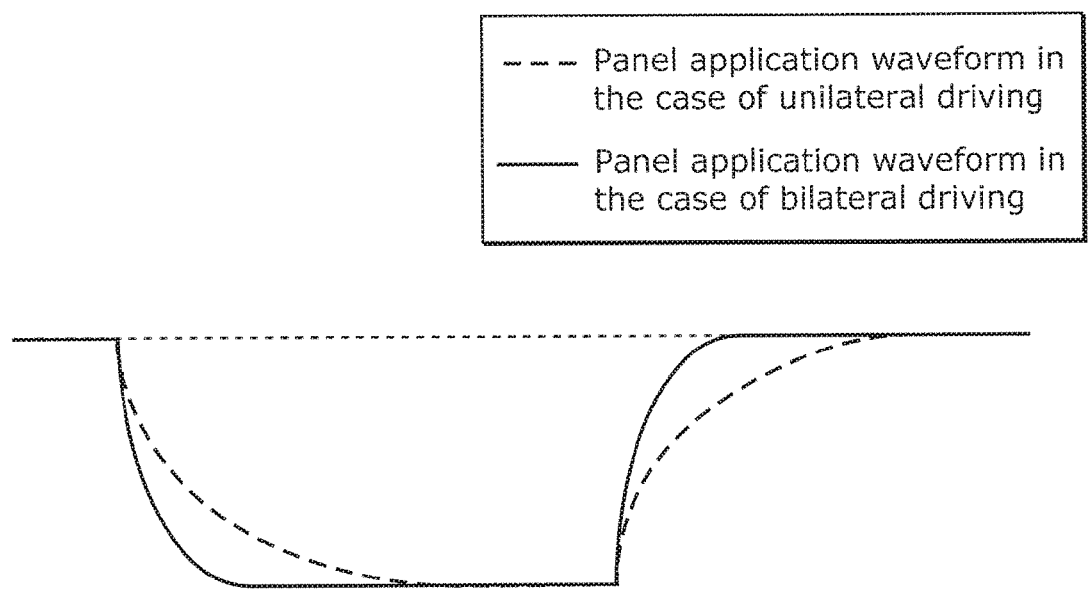
FIG. 3 is a diagram for explaining gate voltage binary driving and gate voltage ternary driving.

To address such dull in waveforms, a configuration in which a gate driver is disposed on the right side and the left side of a panel as illustrated in FIG. 1 and FIG. 2 has been conceived. Gate driver ICs (i. e., gate driver circuits) 12a and 12b are respectively disposed on the right side and the left side of a panel, an output of each of the gate driver ICs 12a and 12b is shorted via the panel (hereinafter referred to as bilateral driving), and the panel is driven from the both sides, thereby improving a panel application waveform as illustrated in FIG. 3.

In addition, a method of dividing a gate signal line at a central portion of a display screen 20 to drive a right portion and a left portion of a panel by a right gate driver and a left gate driver, respectively. However, this method poses problems including a luminance difference occurring at a central portion of the panel.

In addition, gate signal lines 17a and 17b are selectively driven by the gate driver IC 12a and the gate driver IC 12b. Each of the gate signal lines 17a and 17b has one end connected to the gate driver IC 12a and the other end connected to the gate driver IC 12b. It should be noted that there are instances where the gate signal lines 17a and 17b are not specifically distinguished from each other and described as gate signal lines 17. In addition, there are instances where the gate driver ICs 12a and 12b are not specifically distinguished from each other and described as gate driver ICs 12.

When a voltage output from the gate driver IC 12a to each of the gate signal lines 17 differs from a voltage output from the gate driver IC 12b to a corresponding one of the gate signal lines 17, current flows between the gate driver IC 12a and the gate driver IC 12b via the gate signal lines 17. When the number of the gate signal lines 17 to which such different voltages are applied increases, a great short-circuit current flows between the gate driver IC 12a and the gate driver IC 12b, causing damage to the gate driver ICs 12 in some cases.

As a reason for the difference between the output of the gate driver IC 12a and the output of the gate driver IC 12b which are connected to each of the gate signal lines 17, there are conceivable factors as described below. Specifically, there are many conceivable cases including the case where data provided from TCON to the gate driver ICs 12 changes to be different data due to an extrinsic noise, the case where data to be transferred changes in the gate driver ICs 12 due to noise, etc., the case where transferring of data by a clock fails, and the like.

It should be noted that TCON is a timing controller which provides each of the gate driver ICs 12a and 12b with instructions such as light emission timing of each pixel row, timing for writing a video signal, etc. However, TCON is not limited to a timing controller, and includes a number of different kinds of devices including a computer such as a microcomputer and a digital signal processing circuit.

With a liquid-crystal display apparatus, it is less likely to pose a problem even when outputs differ between one gate driver IC and another gate driver IC which are connected to the same gate signal lines. The reason is that, since only a single gate signal line for writing a video signal is selected in one frame period in a liquid-crystal display apparatus, the gate driver ICs 12 are not likely to be directly damaged even when outputs differ between the right and left gate driver ICs 12.

In contrast, the EL display apparatus includes gate signal lines of various types. Some gate signal lines are placed invariably in a selection state (ON voltage application) or non-selection state (OFF voltage application) in one frame period, and thus are in a consecutive ON state or a consecutive OFF state, or repeatedly change between the ON state and the OFF state intermittently. Accordingly, when outputs differ between the right and left gate driver ICs 12, a large number of outputs of the gate driver ICs 12 are placed in a short circuit condition via a large number of gate signal lines, leading to a possible damage to the gate driver ICs 12.

Figure 4:
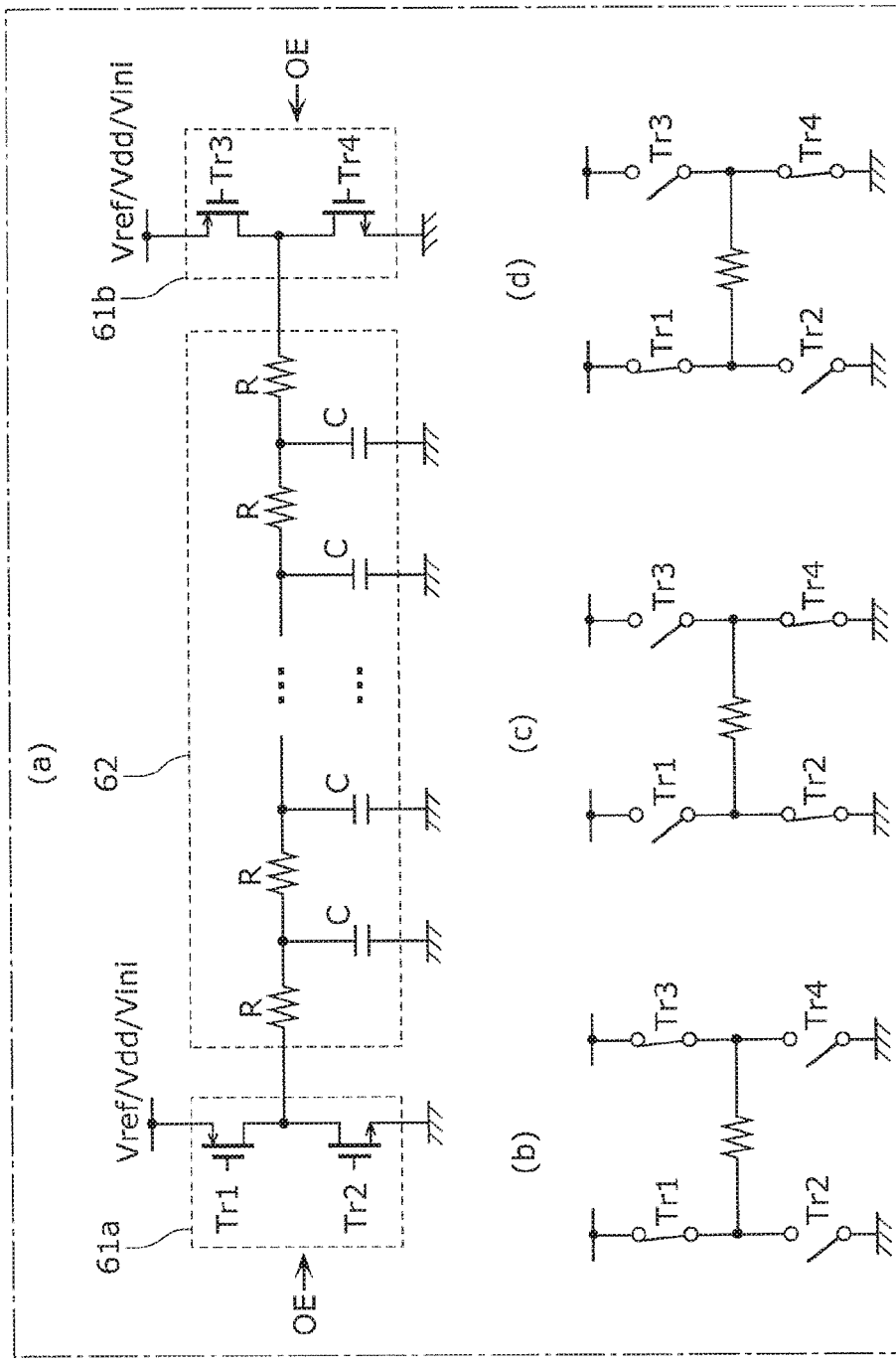
FIG. 4 is an equivalent circuit diagram prepared focusing only on a single output of a gate driver IC (i. e., gate driver circuit.

FIG. 4 illustrates an equivalent circuit diagram prepared focusing only on a single output of the gate driver ICs 12 illustrated in FIG. 1. Gate driver output equivalent circuits 61b and 61a are equivalent circuits of outputs of the right and left gate driver ICs 12, a gate driver output equivalent circuit of the gate driver IC 12a includes Tr1 and Tr2, and the a gate driver output equivalent circuit of the gate driver IC 12b includes Tr3 and Tr4.

In addition, a panel equivalent circuit 62 of (a) in FIG. 4 represents an equivalent circuit of a display panel 21 and includes resistances R and capacitances C. As to connection between the gate driver IC 12a on the left side and the gate driver IC 12b on the right side, panel resistances R (interconnection resistances of the gate signal lines) are mainly disposed between the gate driver IC 12a and the gate driver IC 12b.

When it comes to the operations of Tr1 to Tr4 in the gate driver ICs 12a and 12b, only Tr2 and Tr4 are ON as illustrated in (c) in FIG. 4 when the outputs of the gate driver ICs 12a and 12b are at a low level, and only Tr1 and Tr3 are ON as illustrated in (b) in FIG. 4 when the outputs of the gate driver ICs 12a and 12b are at a high level. In either case, an abnormal current flowing through the display panel 21 is not present.

However, when a delay difference occurs between the output of the gate driver IC 12a on the left side and the output of the gate driver IC 12b on the right: side, or an abnormality occurs in the output of one of the gate driver ICs 12a and 12b, for example, there is the case, depending on the timing, where Tr1 and Tr4 are ON as illustrated in (d) in FIG. 4, causing current to flow between the power supply and ground (GND) of the gate driver ICs 12a and 12b via the panel resistance, leading to possible damage to the gate driver ICs 12a and 12b.

In particular, unlike the liquid crystal display, the EL display apparatus includes a large number of gate signal lines 17 which apply ON voltages in a single screen, and a large number of gate signal lines 17 which repeat switching between ON and OFF in one frame period. Furthermore, since the EL display apparatus includes a large number of gate drivers which are used, and the number of times of applying a gate drive waveform per TV period (frame period) is large, the above-described problem is likely to occur.

In view of the above, the inventors of the present disclosure have invented an EL display apparatus capable of preventing damage of a circuit such as a gate driver and abnormal heating in a panel.

Hereinafter, embodiments are described in greater detail with reference to the accompanying Drawings. However, description that is too detailed will be omitted in some cases.

For example, there are instances where detailed description of well-known matter and redundant description of substantially identical components are omitted. This is for the purpose of preventing the following description from being unnecessarily redundant and facilitating understanding of those skilled in the art.

It should be noted that the accompanying Drawings and subsequent description are provided by the inventors to allow a person of ordinary skill in the art to sufficiently understand the present disclosure, and are thus not intended to limit the scope of the subject matter recited in the Claims.

Embodiment 1

Hereinafter, Embodiment 1 is described with reference to the Drawings.

Figure 5:
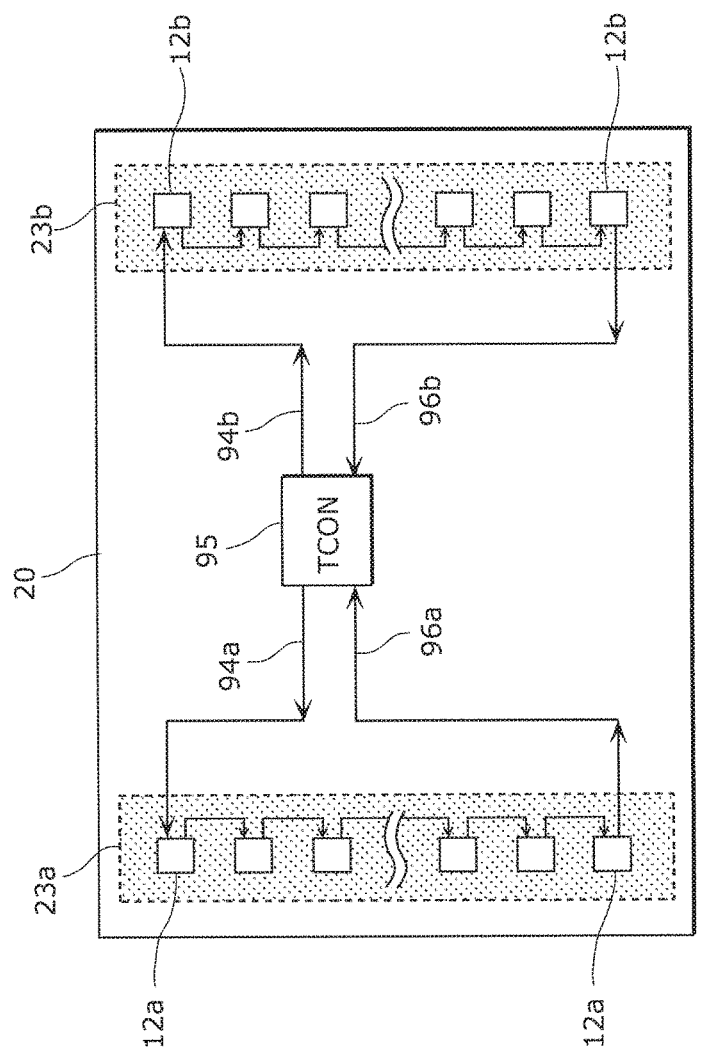
FIG. 5 is a diagram explaining how to drive (control) the EL display apparatus using TCON.

FIG. 2 is a configuration diagram of an EL display apparatus according to Embodiment 1 of the present disclosure. FIG. 1 is a diagram explaining a configuration of a pixel included in the EL display apparatus. In addition, FIG. 5 is a diagram explaining how to drive (control) the EL display apparatus of the present disclosure, using TCON.

In the present disclosure, although a driving transistor 11 and a switching transistor 11 are described as thin-film transistors, the transistors are not limited to the thin-film transistors. The transistors can be formed of a thin-film diode (TFD), a ring diode, etc. as well.

In addition, the transistors are not limited to thin-film elements but may be transistors formed on silicon wafers. For example, a transistor formed using a silicon wafer, removed and transferred onto a glass substrate is exemplified. In addition, a display panel on which a transistor chip formed using a silicon wafer is mounted by bonding on a glass substrate is exemplified.

The transistors 11 may each, of course, be an FET, a MOS-FET, a MOS transistor, or a bipolar transistor. These are also, basically, thin-film transistors. It should be understood that the transistor may be a varistor, a thyristor, a ring diode, a photodiode, a photo transistor, a PLZT element, etc.

In addition, it is preferable that an LDD (lightly doped drain) structure is adopted for the transistors 11, for both of an N channel transistor and a P-channel transistor.

Furthermore, the transistors 11 may be formed any of high-temperature poly-silicon (HTPS), low-temperature poly-silicon (LTPS), continuous grain silicon (CGS), transparent amorphous oxide semiconductors (TAOS, IZO), amorphous silicon (AS), or infrared rapid thermal annealing (RTA).

As illustrated in FIG. 1, an EL display apparatus according to an embodiment of the present disclosure includes: a display screen 20 including pixels 16 arranged in a matrix; gate signal lines 17 (a gate signal line 17a and a gate signal line 17b) disposed for each pixel row of the display screen 20, a source signal line 18 disposed for each pixel column of the display screen 20. The pixels 16 each include: an EL element 15; a driving transistor 11a for supplying a drive current to the EL element 15; a first switching transistor 11d; a second switching transistor 11b; and a capacitor 19.

The driving transistor 11a is a driving device including a source terminal electrically connected, via the first switching transistor 11d, to an anode voltage Vdd that is a first power line, and a drain terminal electrically connected to an anode terminal of the EL element 15. The driving transistor 11a changes a voltage corresponding to a video signal applied between the gate terminal and the source terminal into a drain current corresponding to the video signal. Then, the driving transistor 11a supplies this drain current, as a signal current, to the EL element 15. The drive transistor 11a is formed of a p-type thin film transistor (p-type TFT), for example.

The EL element 15 is an EL element including an anode terminal electrically connected to the drain terminal of the driving transistor 11a and a cathode terminal electrically connected to a cathode voltage Vss that is a second power line, and emits light corresponding to a magnitude of the signal current, as a result of a flow of the signal current caused by the driving transistor 11a.

The magnitude of a signal current is determined by applying a video signal that is applied to the source signal line 18, to the pixel 16 using the second switching transistor 11b.

The first switching transistor 11d is a switching transistor including a gate terminal electrically connected to the gate signal line 17b (gate signal line GE), a source terminal electrically connected to the drain terminal of the driving transistor 11a, and a drain terminal electrically connected to the anode terminal of the EL element 15.

When an ON voltage is applied to the gate signal line 17b (gate signal line GE), the first switching transistor 11d is turned ON, and a signal current is supplied to the EL element 15 from the driving transistor 11a. It should be noted that the first switching transistor 11d may be disposed or formed between the first power line Vdd and the source terminal of the driving transistor 11a. In addition, the gate signal line 17b corresponds to the first gate signal line.

The second switching transistor 11b is a switching transistor including a gate terminal electrically connected to the gate signal line 17a (gate signal line GS), a source terminal electrically connected to the source signal line 18, and a drain terminal electrically connected to the gate terminal of the driving transistor 11a. In addition, the gate signal line 17a corresponds to the second gate signal line.

Furthermore, as peripheral circuits of the display screen 20, the gate driver ICs 12 (gate driver IC 12a and gate driver IC 12b) which drive the gate signal lines 17, the source driver IC (i. e., source driver circuit 14 which outputs a video signal to the source signal lines 18, and a control circuit (not illustrated) which controls the gate driver ICs 12, the source driver IC 14, etc are included. The display screen 20 displays an image based on a video signal inputted to the EL display apparatus from an external source.

The gate signal lines 17 are connected to the gate driver ICs 12, and to the pixels 16 which belong to a corresponding pixel row. The gate signal lines 17 each have a function of controlling the timing of writing a video signal to the pixels 16 which belong to a corresponding pixel row, and a function of controlling the timing of turning ON or OFF of the pixels 16.

Each of the gate driver ICs 12 is a driving circuit which is connected to the gate signal lines 17, and has a function of controlling conduction (ON) and non-conduction (OFF) of the switching transistors 11 (the first switching transistor 11d and the second switching transistor 11b) included in each of the pixels 16, by outputting a selection signal to the gate signal lines 17. It should be noted that a voltage for placing the switching transistors 11 in a conduction state is called an ON voltage or a selection voltage, in some cases. A voltage for placing the switching transistors 11 in a non-conduction state is called an OFF voltage or a non-selection voltage, in some cases. In addition, hereafter, the first switching transistor 11d and the second switching transistor 11b are not specifically distinguished, and called switching transistors 11, in some cases.

For example, when an ON voltage is applied to the gate signal line 17a in a pixel circuit illustrated in FIG. 1 which will be described later, the second switching transistor 11b is turned ON, and a video signal applied to the source signal line 18 is applied to the pixel 16. In addition, the gate driver ICs 12 each include a plurality of scanning and outputting buffer circuits.

As illustrated in FIG. 2, the gate driver ICs 12 (gate driver ICs 12a and 12b) are disposed on the left side and the right side of the display screen 20, and each of the gate signal lines 17 is connected to at least one of the gate driver IC 12a and the gate driver IC 12b. According to the embodiment illustrated in FIG. 2, each of the gate signal line 17a and the gate signal line 17b has ends to which the gate driver ICs 12a and 12b disposed on the left side and the right side of the display screen 20 are connected. The gate driver IC 12a is mounted on a COF (chip on film) 22a, and the gate driver IC 12b is mounted on a COF 22b. The source signal line 18 is disposed for each pixel column of the display screen 20, connected to a corresponding one of the source driver IC 14, and connected to the pixels 16 which belong to a corresponding pixel column. It should be noted that a printed circuit board 23c in FIG. 2 is a printed circuit board on which a circuit for a video signal is formed or mounted. In addition, printed circuit boards 23a and 23b are printed circuit boards on each of which a circuit for scanning is formed or mounted.

The source driver IC 14 is a driving circuit connected to one end of the source signal lines 18, and has a function of outputting a video signal to supply or apply the video signal to the pixels 16 via the source signal lines 18. The source driver IC 14 is mounted on a COF (chip of film) 22c, It should be noted that the source driver IC 14 may have a multi-delay function which enables setting of an output timing of a video signal for each terminal or for each block.

In addition, it is possible to form each of the COFs 22a, 22b, and 22c so as to absorb light, by applying or forming light absorbing paint or a material, or applying a sheet, on a surface of the COFs 22a, 22b, and 22c. Furthermore, it is also possible to dissipate heat from each of the driver circuits (the gate driver ICs 12 and the source driver IC 14) by disposing or forming a heatsink on a surface of the driver ICs mounted on the COFs 22a, 22b, and 22c. In addition, it is also possible to dissipate heat generated by the driver circuits, by disposing or forming a heat dissipation sheet or a heatsink on a back surface of the COFs 22a, 22b, and 22c.

The control circuit of which illustration is omitted has a function of controlling the gate driver ICs 12 and the source driver IC 14, and specifically exchanges a signal with the gate driver ICs 12 and the source driver IC. The control circuit may be configured so as to: include a memory (not illustrated) on which correction data, etc. of each of the EL elements 15 is recorded; read the correction data, etc. written in the memory; correct a video signal inputted from outside, based on the correction data; and output the corrected video signal to the source driver IC 14. It should be noted that the control circuit also operates as the above-described TCON 95.

The channel of the switching transistors 11 are bidirectional and the names of the source terminal and the drain terminal are for facilitating the explanation, and thus the source terminal and the drain terminal may be switched. Furthermore, the source terminal and the drain terminal may be called a first terminal and a second terminal, for example.

In addition, the driving transistor 11a and the switching transistors 11 are described as thin-film transistors (TFTs); however, the transistors are not limited to the TFTs. The transistors can be formed of a thin-film diode (TFD), a ring diode, etc. as well.

The driving transistor 11a and the switching transistors 11 each may, of course, be an FET, a MOS-FET, a MOS transistor, or a bipolar transistor. These are also, basically, thin-film transistors. It should be understood that the transistor may be a varistor, a thyristor, a ring diode, a photo-diode, a photo transistor, a PLZT element, etc.

The gate driver ICs 12 output, to gate signal lines 17, a voltage for turning the switching transistors 11 ON (selection state) or OFF (non-selection state). The source driver circuit (IC) generates video signals corresponding to an input image.

Among a plurality of EL elements 15, a quench state is sequentially started for one row of the EL element 15 at a time based on a first pulse of selection signals inputted via the gate signal lines 17, and light-emission data is written by the source signal lines 18 based on a second pulse of the selection signals.

A driving circuit unit [control circuit (TCON 95)], the gate driver IC 12, and the source driver IC 14 supply the gate signal lines 17 and the source signal lines 18 with a selection signal and a video signal, respectively, such that writing of light-emission data on the first row of the EL elements 15 starts before the quench state starts at the last row of the EL elements 15, and writing of light-emission data on the last row of the EL elements 15 ends after a luminescent state starts at the first row of the EL elements 15.

Figure 6:
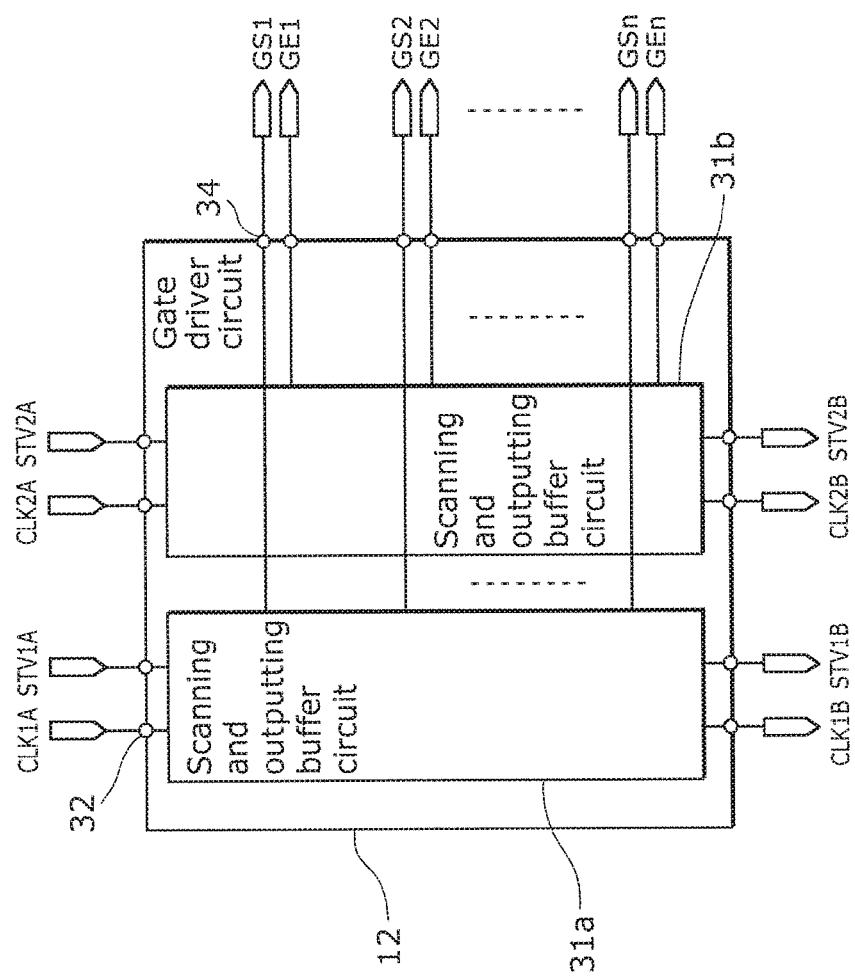
FIG. 6 is a block diagram illustrating a configuration of the gate driver IC.

The gate driver ICs 12 each include scanning and outputting buffer circuits 31 (scanning and outputting buffer circuits 31a and 31b), and input terminals 32, and an output terminals 34, as illustrated in FIG. 6. It should be noted that there are instances where the scanning and outputting buffer circuits 31a and 31b are not specifically distinguished from each other and described as scanning and outputting buffer circuits 31. It should be noted that the input terminals 32 and the output terminals 34 correspond to data input terminals and data output terminals, respectively.

Figure 7:
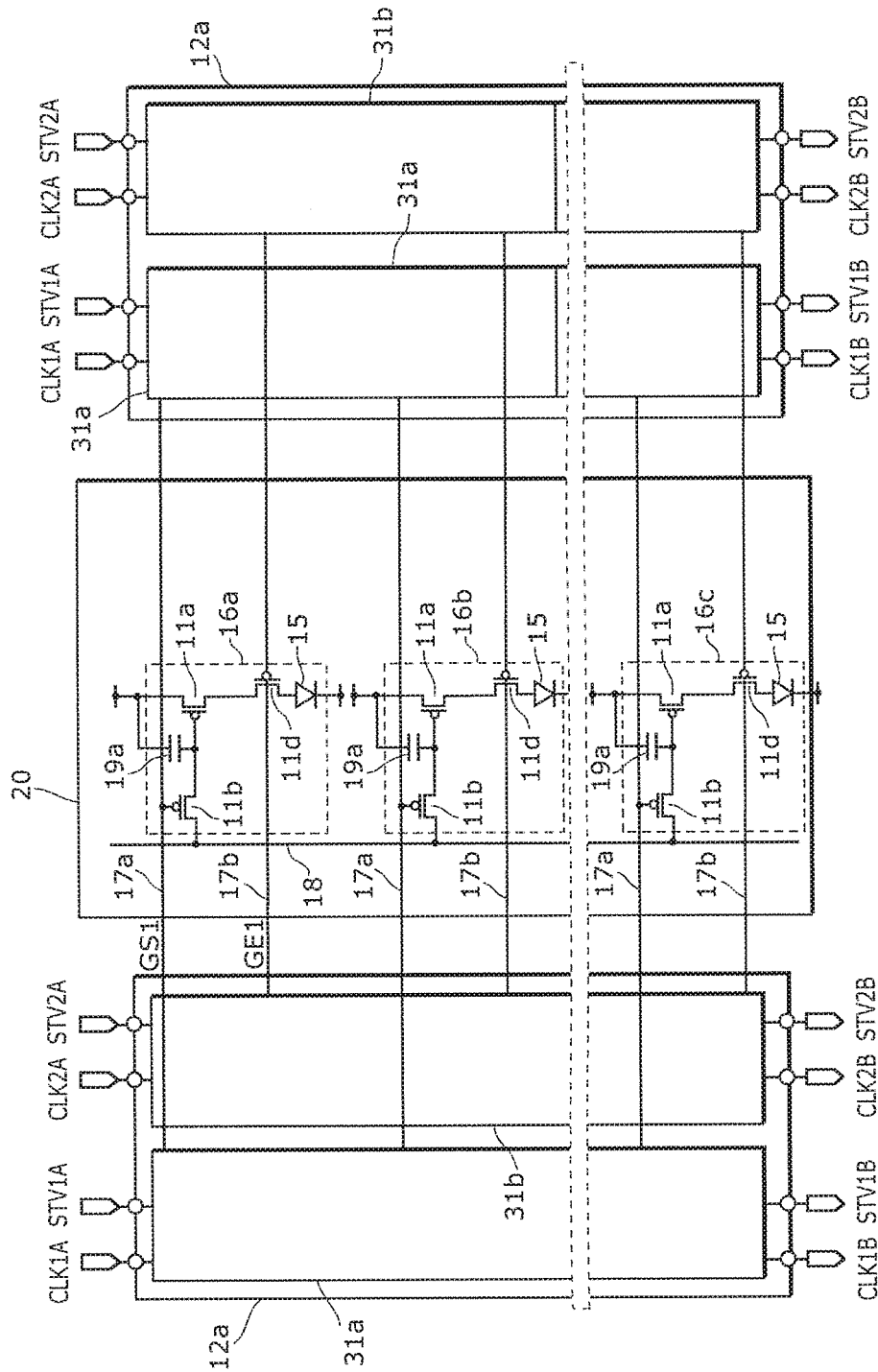
FIG. 7 is a diagram illustrating a relation of connection between the gate driver IC and a display panel.

FIG. 7 is a diagram illustrating a relation of connection between the display panel 21 and the gate driver ICs 12 disposed on the right side and the left side of the display panel 21. The gate driver ICs 12a each include two scanning and outputting buffer circuits 31a and 31b. In addition, the scanning and outputting buffer circuits 31a each include input terminals CLK1A and STV1A, and output terminals CLK1B, STV1B, and GS1 to GSn.

The scanning and outputting buffer circuits 31a each include shift registers. Data inputted from STV1A is shifted in the shift registers according to an operation of CLK1A, and outputs GS1 to GSn which are determined for each of the shift registers are generated.

Data after the shifting in the shift registers is output from STV1B. Waveforms inputted to CLK1A are output from CLK1B as they are. Whether or not a buffer is included between the input and output depends on the circuit configuration.

Scanning and outputting buffer circuits 31b each include input terminals CLK2A and STV2, and output terminals CLK2B, STV2B, and GE1 to GEn, and perform an operation in the same manner as the scanning and outputting buffer circuits 31a.

As to the connection state of the gate signal lines 17 and the gate driver ICs 12, as illustrated in FIG. 7, the gate signal lines 17a are connected to GS outputs of the scanning and outputting buffer circuits 31a in the scanning and outputting buffer circuit 31a of each of the right and left gate drivers.

Likewise, the gate signal lines 17b are connected to GE outputs of the scanning and outputting buffer circuits 31b in the scanning and outputting buffer circuit 31b each of the right and left gate drivers.

As described above, data output from the control circuit (TCON 95) of the driving circuit and inputted into STV*A terminals (STV1A and STV2A) of the gate driver ICs 12 are shifted in synchronization with a clock inputted to the scanning and outputting buffer circuits 31 and CLK*A terminals (CLK1A and CLK2A). It should be noted that the scanning and outputting buffer circuits 31a and 31b correspond to the first scanning circuit and the second scanning circuit, respectively. In addition, data inputted into the STV*A terminals (STV1A and STV2A) correspond to control pulses.

An ON voltage corresponding to a data position in the scanning and outputting buffer circuits 31 is output to the gate signal lines 17 (selection state). In addition, an OFF voltage is outputted (non-selection state). The scanning and outputting buffer circuits 31a and the scanning and outputting buffer circuits 31b may be independently operated, and the frequencies of signals which are inputted to, the input terminals CLK1A and CLK2A may be different from each other.

Figure 8:
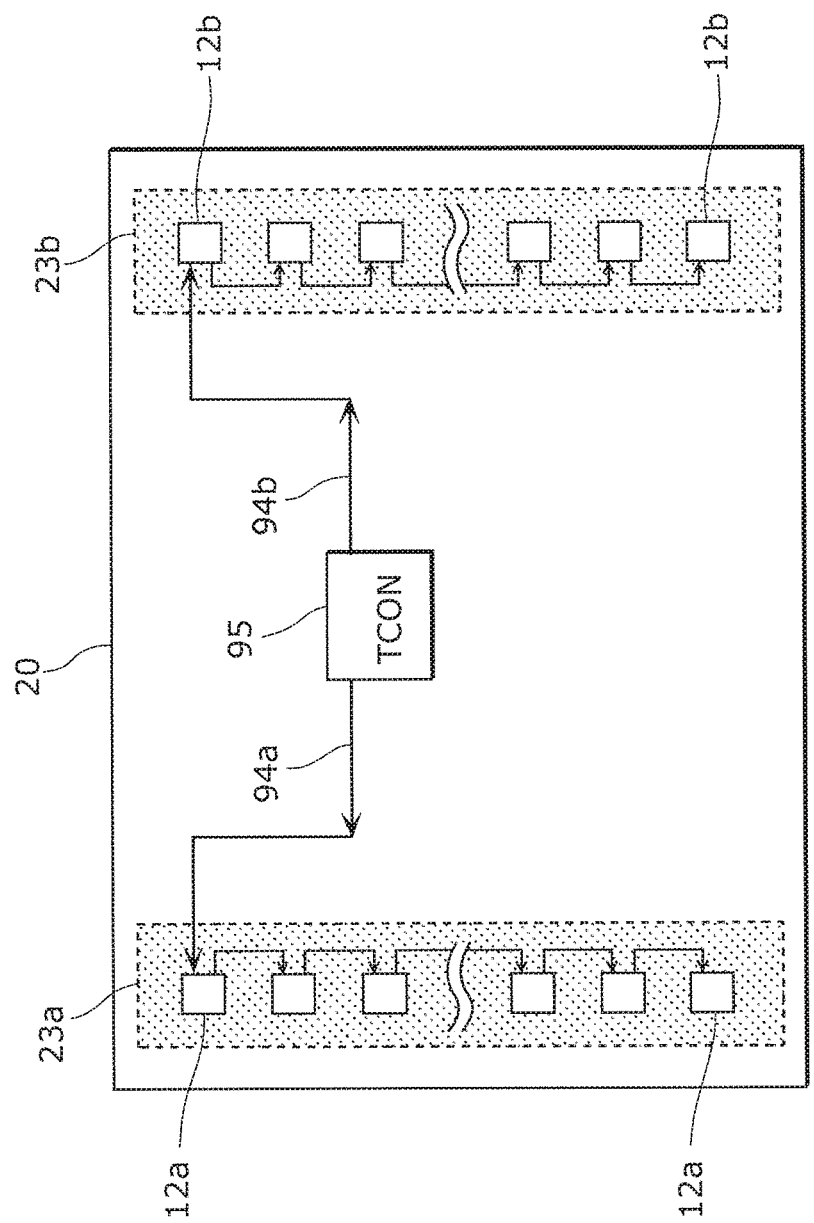
FIG. 8 is a diagram for explaining a state where STV signals output from the TCON propagate through a plurality of gate driver ICs which are connected in a cascade arrangement.

After shifted for a specified number of times in the shift registers, signals inputted from STV1A and STV2A are output from STV1B and STV2B, respectively, become output signals of the circuit, and are handled as input signals for the next circuit when the circuits are in a cascade arrangement. FIG. 8 illustrates a connection diagram of the case where STV signals 94a and 94b which are output from TCON 95 propagate through a plurality of gate driver ICs 12a and 12b which are connected in a cascade arrangement.

Figure 9:
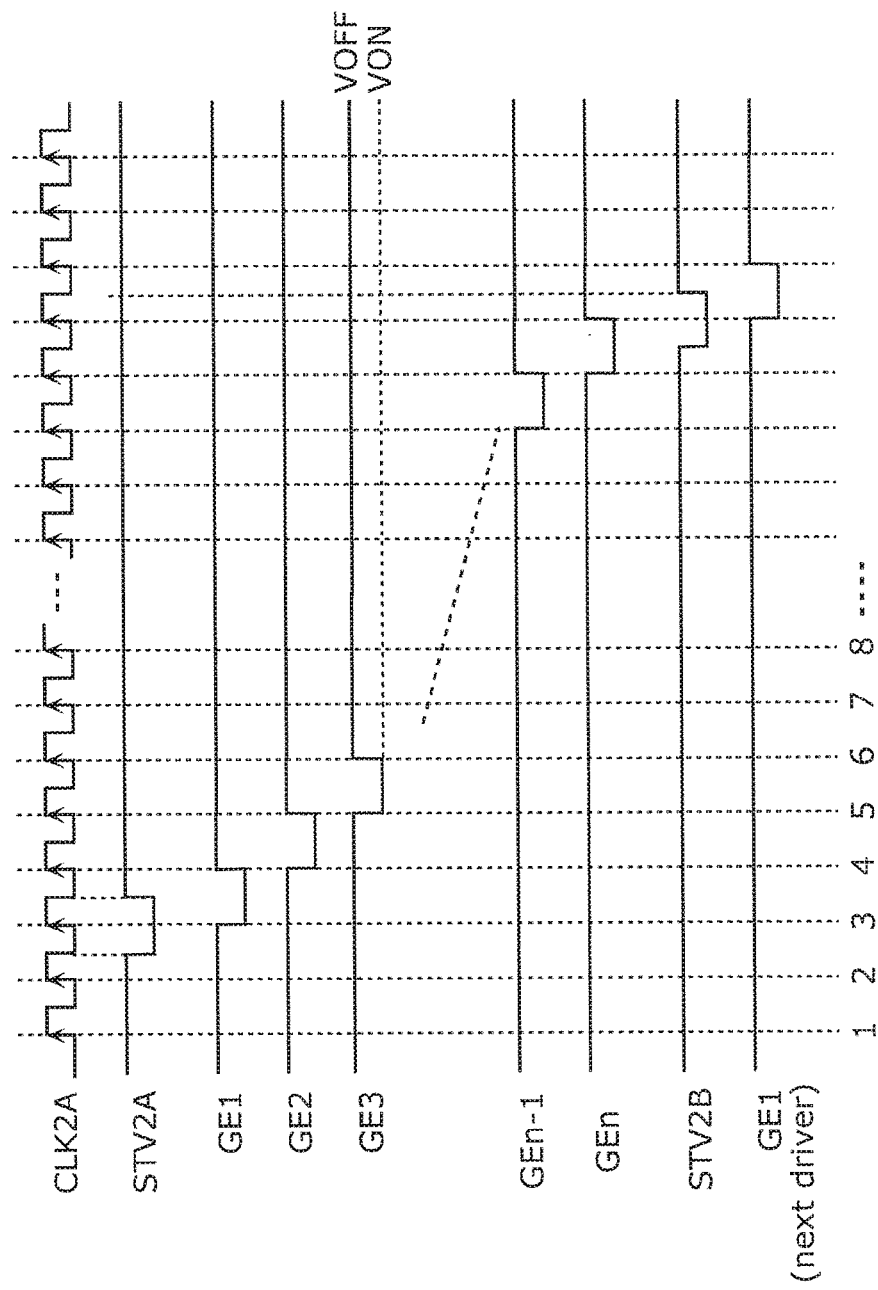
FIG. 9 is a diagram illustrating a pulse output to a gate signal line of a liquid-crystal display apparatus.
Figure 10:
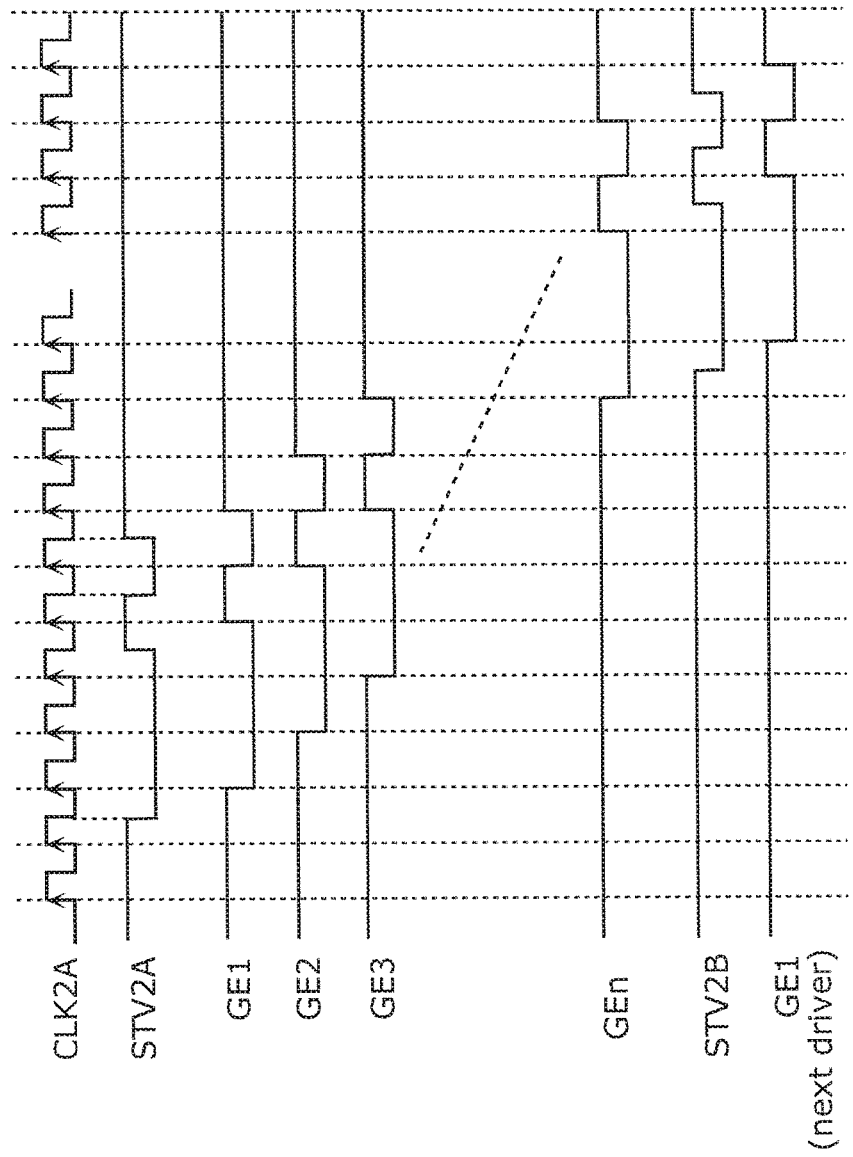
FIG. 10 is a diagram illustrating a pulse output to the gate signal line of the EL display apparatus according to Embodiment 1.

FIG. 9 illustrates an example of a drive timing chart related to the gate signal line 17b. FIG. 9 is a diagram illustrating a pulse output to a gate signal line of a liquid-crystal display apparatus, in EL display apparatus, there are instances where ON period driving is performed once in one frame period as illustrated in FIG. 9. However, in most of the gate signal lines in the EL display apparatus, a large number of times of ON periods occur in one frame period as illustrated in FIG. 10.

FIG. 9 illustrates the case where the input signal STV2A has a length of 1 CLK. An ON voltage is output to the gate signal lines for a period of 1 CLK. Accordingly, each of gate signal line outputs GE1 to GEn has a length of 1 CLK (an ON voltage period of GE1 to GEn is 1 CLK), an output appearing first in GE1 shifts for every rise of CLK2A, and appears in GEn after n-th CLK is inputted. When connected in the cascade arrangement, STV2B signal is propagated to the STV2A which is the next circuit, leading to an operation of outputting GE1 in the next circuit.

It is possible to variously control the waveform of an output: GE according to the waveform inputted to STV2A. For example, FIG. 10 illustrates a timing chart of the case where data is transmitted to STV2A in order of High for 3 CLKs, Low for 1 CLK, and High for 1 CLK.

Since only a single gate signal line for writing a video signal is selected in one frame period in a liquid-crystal display apparatus, the gate driver ICs 12 are not likely to be directly damaged even when outputs differ between the right and left gate driver ICs 12.

In contrast, the EL display apparatus includes gate signal lines of various types. Some gate signal lines are placed invariably in a selection state (ON voltage application) or non-selection state (OFF voltage application) in one frame period, and thus are in a consecutive ON state or a consecutive OFF state, or repeatedly change between the ON state and the OFF state intermittently. Accordingly, when outputs differ between the right and left gate driver ICs 12, a large number of outputs of the gate driver ICs 12 are placed in a short circuit condition via a large number of gate signal lines, causing damage to the gate driver ICs 12.

In the EL display apparatus, an ON voltage is applied to a plurality of gate signal lines at an arbitrary time point within one frame period, as illustrated in FIG. 10. In addition, the ON voltage is sequentially applied. In some cases, an ON voltage and an OFF voltage are alternately applied for each pixel row.

Figure 11:
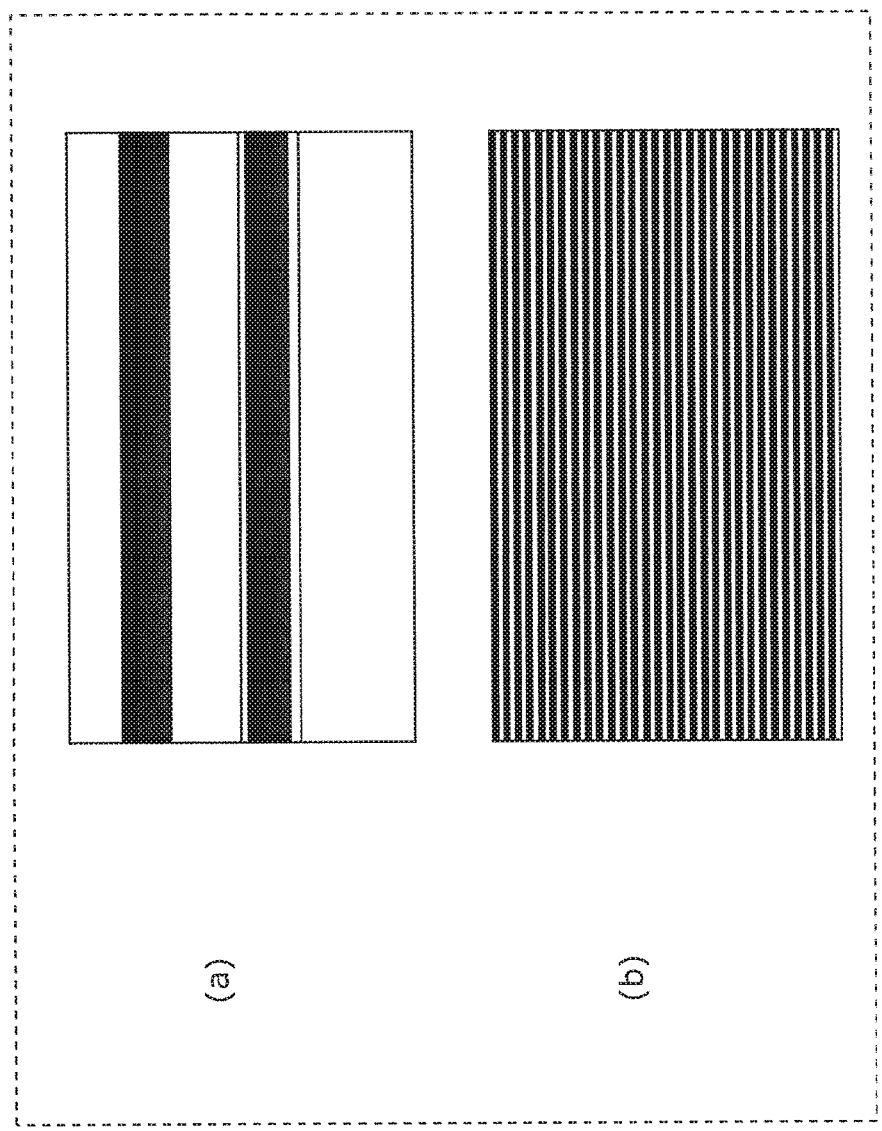
FIG. 11 illustrates an example of a display screen of the case where a switching transistor repeats turning ON or OFF several times in one frame period.

The gate signal line 17b (GE) of FIG. 1 is an example of the case where a plurality of ON voltages are sequentially applied or applied to a large number of the gate signal lines, as described above. A gate terminal of the switching transistor 11d is connected to the gate signal line 17b. The switching transistor 11d controls turning ON and OFF of current supplied to the EL element 15. It is possible to implement black insertion driving and duty driving, by turning ON and OFF the switching transistor 11d, as illustrated in FIG. 11, The black insertion driving and the like allow adjusting the performance of video and still images, and adjusting a luminance of the display screen. The gate signal line 17b controls current to be supplied to the EL element 15, and thus there are cases where turning ON and OFF are repeated several times within one frame period depending on the driving method. FIG. 11 illustrates an example of the case. In white display portions, the EL element 15 is turned ON, (a) in FIG. 11 illustrates the case where a period in which an ON voltage is applied is relatively long within one frame period, and (b) in FIG. 11. illustrates the case of switching between ON and OFF for each pixel row.

Such a driving method is not applied to a liquid crystal display, a plasma display, etc., and is unique to an EL display apparatus. When outputs differ between the right and left gate driver ICs 12 in this state, the gate driver ICs 12 might be damaged due to short between the outputs. Thus, emergency stop is necessary to prevent damage. Or, it is necessary to bring the EL display apparatus back to a normal state.

The following describes a characteristic configuration of an EL display apparatus according to the present embodiment.

As described above, each of the gate signal lines 17b are bilaterally driven by the gate driver IC 12a and the gate driver IC 12b. In addition, a voltage which is specific to an EL display apparatus and repeatedly switches between an ON voltage and an OFF voltage during one frame period is applied to each of the gate signal lines 17b, Accordingly, when a voltage applied to each of the gate signal lines 17b by the gate driver IC 12a is different from a voltage applied to each of the gate signal lines 17b by the gate driver IC 12b, at least one of the gate driver ICs 12a and 12b is damaged in some cases.

In view of the above, a feature of the present embodiment is to input output signals 96a and 96b of the gate driver ICs 12 for the last scanning line, as illustrated in FIG. 5. Output signals of the gate driver ICs for the last scanning lines of the right and left gate drivers are provided to TCON 95, and a specified process is carried out based on the signals by TCON 95.

As an example of the specified process, when a time difference exists between the output signals 96a and 96b, a delay time adjusting process is performed by TCON 95 for eliminating the time difference, and when one of the signals is at a high level or at a low (L) level for a specified period of time, it is determined that there is abnormality, and a drive stop process for the gate driver ICs 12 is performed. As another example, when a delay time difference greater than a predetermined value exists and it is determined that reduction of the delay time difference is impossible, the drive stop process for the gate driver ICs 12 is performed. As yet another example, when current flowing into a power supply of the gate driver ICs 12 is monitored and the monitored current is greater than a predetermined value, the drive stop process for the gate driver ICs 12 is performed.

As another example, TCON 95 controls the gate driver ICs 12*a* and 12*b* such that the gate driver IC 12*a* on the left side and the gate driver IC 12*b* on the right side perform output to each of the gate signal lines 17 with substantially the same output timing. When there is a gap between the output timing, the gate driver ICs 12*a* and 12*b* are stopped or the timing of control signals (control pulses) to be provided to the gate driver ICs 12*a* and 12*b* is adjusted such that the output timing substantially matches.

As yet another example, TCON 95 applies signal data to a control signal (control pulse) to be applied to the output signals (STV1B signal and STV2B signal) of the scanning and output buffer circuit 31 of the gate driver IC 12*a* or the gate driver IC 12*b*, such that the OFF voltages are output from the all of the gate signal lines 17 or the OFF voltages are output to the all of the gate signal lines 17. The both ends of each of the gate signal lines driven by the gate driver ICs 12 disposed on the right side and the left side of the display screen 20 are caused to have the same potential (an OFF voltage or an ON voltage), thereby preventing short of outputs of the gate driver IC 12*a* on the left side and the gate driver IC 12*b* on the right side. This prevents the gate driver ICs 12 from being damaged, and also prevents the panel from being overheated and damaged and the power supply and the like of the driving circuit from being damaged.

The drive stop process is, for example, to turn OFF the power supply of the EL display apparatus as a whole. The drive stop process represents turning OFF of the gate driver ICs 12. In addition, instead of stopping the power supply, a specified signal may be provided to the gate driver ICs 12 from TCON 95. An example is to set only an STV signal at a low (L) level while a UK signal remains as it is. Data of the scanning and outputting buffer circuit 31 is cleared by inputting the STV signal which is a low level signal as a specified signal, and thus a voltage output to all of the gate signal lines 17 becomes an OFF voltage.

In addition, as illustrated in FIG. 4, an OE (output enable) signal to be provided to an OE terminal (not illustrated) of each of the gate driver ICs 12 may be controlled to place each of the gate driver IC 12*a* and the gate driver IC 12*b* in the state illustrated in (b) or (c) in FIG. 4.

As a result, short of outputs from the gate driver IC 12*a* on the left side and the gate driver IC 12*b* on the right side is prevented, making it possible to prevent damage to the gate driver ICs 12. Unlike other display apparatuses, particularly in the EL display apparatus, the gate driver ICs 12 each output an output pulse multiple times (the number of times of switching between an ON voltage and an OFF voltage) in one frame period, or an output pulse sequentially or intermittently for a plurality of periods H (a plurality of horizontal periods). Accordingly, short occurs in a voltage via the gate signal lines 17 connected to the right and left gate driver ICs 12, and thus the gate driver ICs 12 are likely to be damaged. In view of this, the present embodiment is effective.

Figure 12:
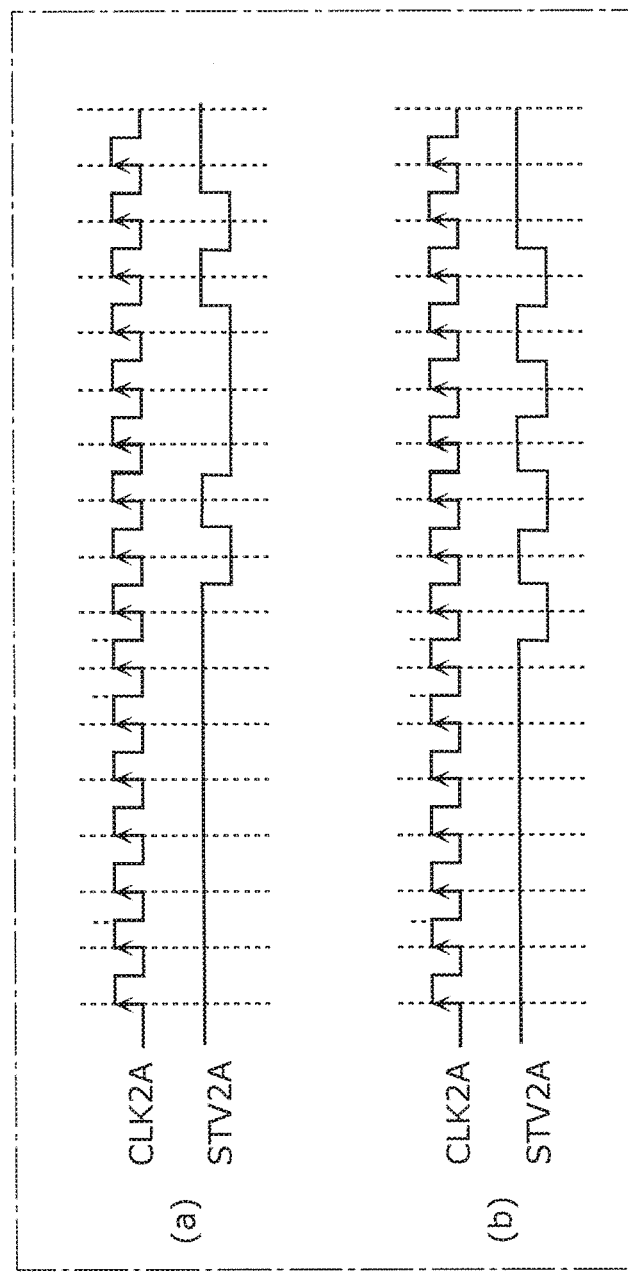
FIG. 12 is a diagram illustrating gate signal input of the case where an output pulse appears several times in one frame period.

FIG. 12 illustrates a state of inputting a gate signal when an output pulse appears multiple times in one frame period. Since, regarding the STV2A signal, the number of falling represents the number of turning ON and the number of rising represents the number of turning OFF, it is indicated that the gate driver IC 12*a* is turned ON and OFF three times and the gate driver IC 12*b* is turned ON and OFF four times.

Furthermore, although FIG. 12 illustrates a method of generating a unique ON voltage selecting pattern, a luminance is invariable as long as the amount of black insertion is the same whatever the selecting signal pattern is. The state in which the amount of black insertion is the same is the state in which the number of the gate signal lines 17*b* to which an ON voltage is applied and the number of the gate signal lines 17*b* to which an OFF voltage is applied are the same. For example, when the state where there are sequentially 20 gate signal lines 17*b* to which an ON voltage is applied and the state where there are 20 pairs of gate signal lines on one of which an ON voltage is applied are compared, the display luminance is the same. Accordingly, it is possible to implement an STV signal pattern which is easily detected by TCON 95.

Modification Example of Embodiment 1

Figure 13:
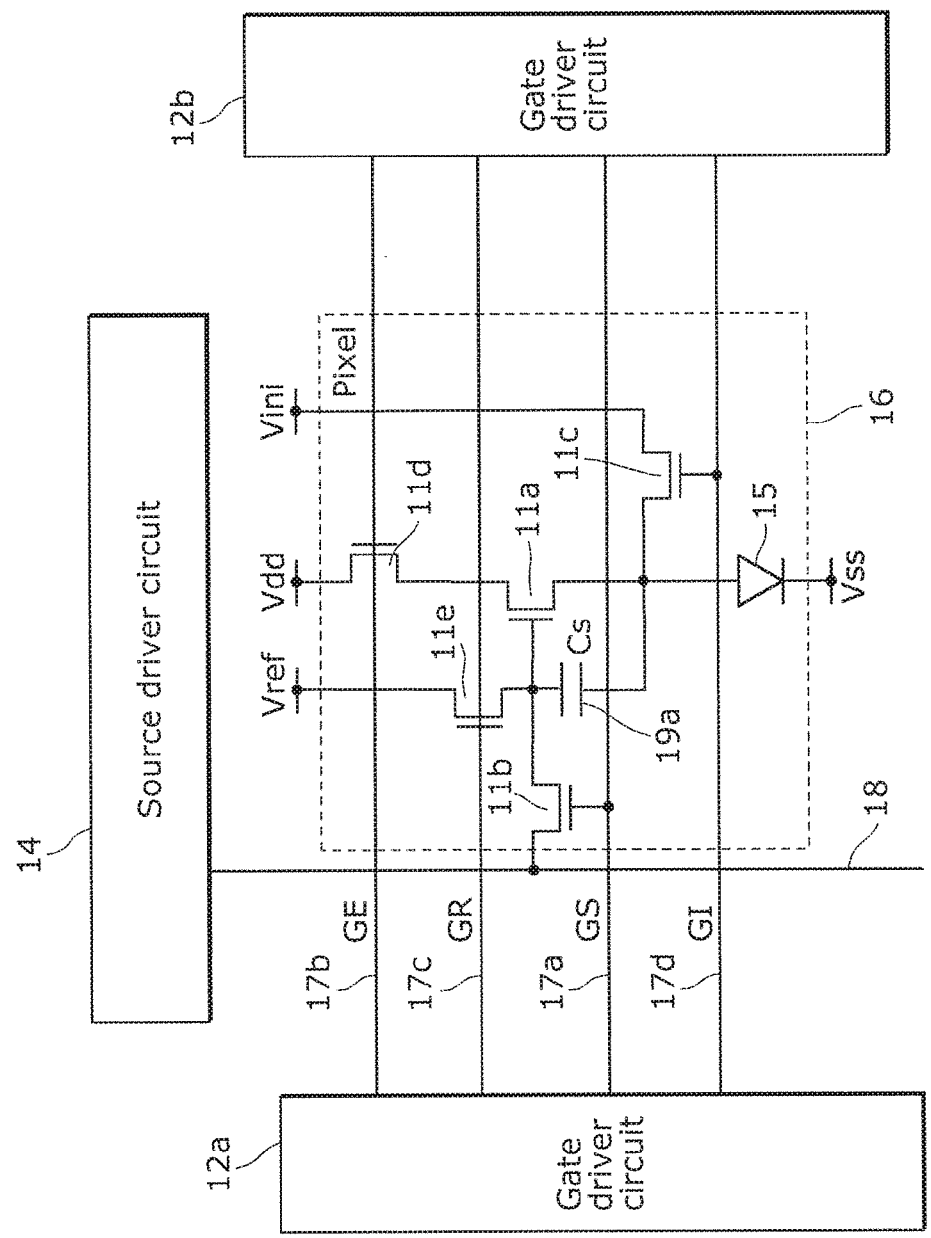
FIG. 13 is a circuit diagram illustrating a configuration of a pixel included in an EL display apparatus according to a modification example of Embodiment 1.
Figure 14:
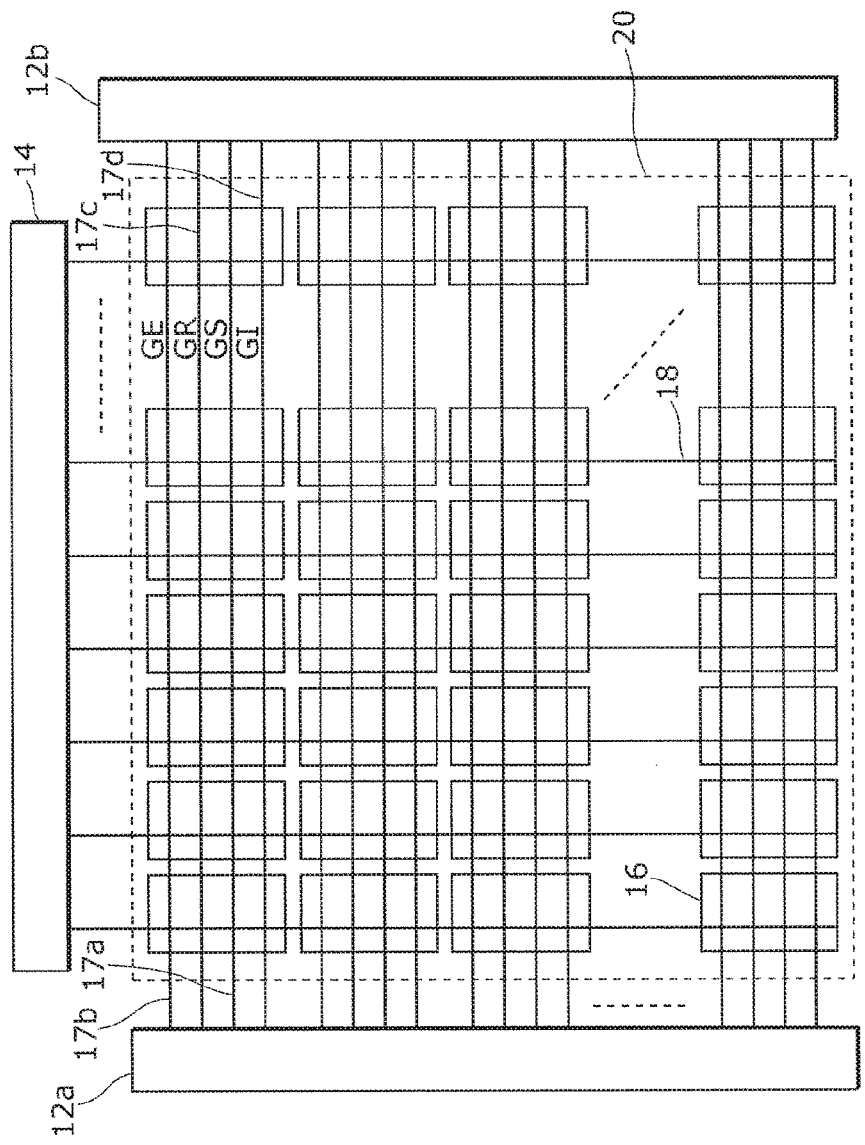
FIG. 14 is a block diagram illustrating an electrical configuration of the EL display apparatus according to the modification example of Embodiment 1.
Figure 15:
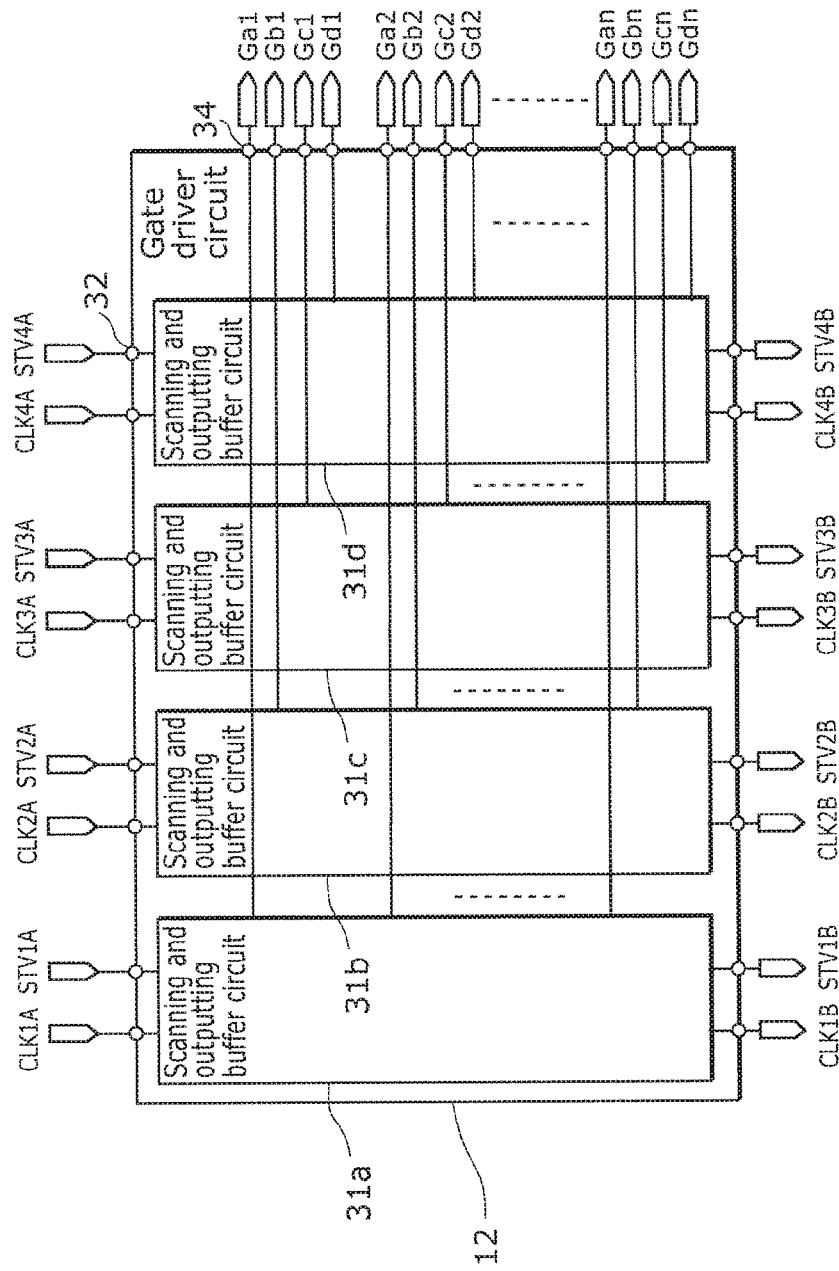
FIG. 15 is a block diagram illustrating a configuration of the gate driver IC.

According to the above-described Embodiment 1, two types of the gate signal lines are connected to the panel. Likewise, it is possible to implement detection using an STV signal when three or more types of the gate signal lines are present as illustrated in FIGS. 13 to 15. In other words, an EL display apparatus according to the present modification is different from the EL display apparatus of Embodiment 1 in that the EL display apparatus according to the present modification includes four gate signal lines (four types) for each of the pixels. Hereinafter, the present modification shall be described with reference to the Drawings.

FIG. 13 illustrates an example of a pixel circuit included in the EL display apparatus according to the present modification. The pixel circuit illustrated in FIG. 13 includes: an EL element 15; a driving transistor 11*a* for supplying a drive current to the EL element 15; a first switching transistor 11*d*; a second switching transistor 11*b*; a third switching transistor 11*c*; a fourth switching transistor 11*e*; and a capacitor 19. A display screen 20 includes pixels each having the EL element 15 are arranged in a matrix. It should be noted that, hereafter in some cases, the first to fourth switching transistors 11*b* to lie are not specifically distinguished, and called switching transistors 11*b* to 11*e*, or switching transistors 11.

The driving transistor 11*a* is a driving device including a drain terminal electrically connected via the first switching transistor 11*d* to the first power line and supplied with an anode voltage Vdd, and a source terminal electrically connected to an anode terminal of the EL element 15. The driving transistor 11*a* changes a voltage corresponding to a video signal applied between the gate terminal and the source terminal, into a drain current corresponding to the video signal. Then, the driving transistor 11*a* supplies this drain current as a single current to the EL element 15. The drive transistor 11*a* is formed of, for example, an n-type thin film transistor (n-type TFT).

The EL element 15 is a light-emitting device which includes an anode terminal electrically connected to the source terminal of the driving transistor 11*a*, a cathode terminal electrically connected to a second power line and supplied with a cathode voltage Vss, and emits light corresponding to a magnitude of the signal current, as a result of a flow of the signal current caused by the driving transistor 11*a*.

The magnitude of a signal current is determined by applying a video signal that is applied to the source signal line 18, to the pixel 16 by the second switching transistor 11b. The first switching transistor 11d is a switching transistor including a gate terminal electrically connected to the gate signal line 17b (gate signal line GE), a source terminal electrically connected to the drain terminal of the driving transistor 11a, and a drain terminal electrically connected to the first power line and supplied with the anode voltage Vdd.

When an ON voltage is applied to the gate signal line 17b (gate signal line GE), the first switching transistor 11d is turned ON, and a signal current is supplied to the EL element 15 from the driving transistor 11a. It should be noted that the first switching transistor 11d may be disposed or formed between the source terminal of the driving transistor 11a and the anode terminal of the EL element 15.

The second switching transistor 11b is a switching transistor including a gate terminal electrically connected to the gate signal line 17a (gate signal line GS), a source terminal electrically connected to the gate terminal of the driving transistor 11a, and a drain terminal electrically connected to the source signal line 18.

The third switching transistor 11c is a switching transistor including a gate terminal electrically connected to the gate signal line 17d (gate signal line GI), a source terminal electrically connected to the source terminal of the driving transistor 11a, and a drain terminal to which an initial voltage (initialization voltage, Vini) is applied or supplied. The third switching transistor 11c applies the initial voltage (Vini) to the source terminal of the driving transistor 11a and one of the electrodes of the capacitor 19 when the ON voltage is applied to the gate signal line 17d.

The fourth switching transistor 11e is a switching transistor including a gate terminal electrically connected to the gate signal line 17c (gate signal line GR), a source terminal electrically connected to the gate terminal of the driving transistor 11a, and a drain terminal to which a reference voltage (Vref) is applied or supplied. The fourth switching transistor 11e applies the reference voltage (Vref) to the gate terminal of the driving transistor 11a when the ON voltage is applied to the gate signal line 17c.

Here, an electrically connected state is a state in which a voltage pathway or a current pathway is formed or can be formed. For example, the driving transistor and the first transistor are electrically connected even when a fifth transistor is disposed between the driving transistor and the first transistor. It should be noted that, in the Description of the present disclosure, there are instances where the term connect means electrically connect.

The channel of the switching transistors 11 are bidirectional and the names of the source terminal and the drain terminal are for facilitating the explanation, and thus the source terminal and the drain terminal may be switched. Furthermore, the source terminal and the drain terminal may be called a first terminal and a second terminal, for example. In FIG. 13, the transistors 11 (the driving transistor 11a and the switching transistors 11b, 11c, 11d, and 11e) included in a pixel are all formed in, for example, an n-type. However, the transistors 11 of the pixel are not limited to the n-type transistors according to the present modification. The transistors 11 may be formed of only the n-type transistors or only the p-type transistors. In addition, the transistors 11 may be formed using both of the n-type and the p-type transistors. In addition, the transistor 11a may include both of the p-type and the n-type transistors.

FIG. 14 is a block diagram illustrating an electrical configuration of the EL display apparatus according to the present modification.

As illustrated in FIG. 14, the EL display apparatus according to the present modification includes: a display screen 20 including pixels 16 arranged in a matrix; gate signal lines 17 (gate signal line 17a, gate signal line 17b, and gate signal line 17c) disposed for each pixel row of the display screen 20, a source signal line 18 disposed for each pixel column of the display screen 20. Furthermore, as peripheral circuits of the display screen 20, the gate driver ICs (i. e., gate driver circuits) 12 (gate driver ICs 12a and 12b) which drive the gate signal lines 17, the source driver IC (i. e., source driver circuit) 14 which output a video signal to the source signal lines 18, and a control circuit (not illustrated) which controls the gate driver ICs, the source driver IC, etc.

The display screen 20 displays an image based on a video signal inputted to the EL display apparatus from an external source.

The gate signal lines 17 are connected to the gate driver ICs 12 and to the pixels 16 which belong to a corresponding pixel row. The gate signal lines 17 each have a function of controlling the timing of writing a video signal to the pixels 16 which belong to a corresponding pixel row, a function of controlling the timing of applying various voltages such as the initialization voltage and the reference voltage to the pixels 16, and a function of controlling the timing of emission and turning off of the pixels 16.

Each of the gate driver ICs 12 is a driving circuit which is connected to the gate signal lines 17, and has a function of controlling conduction (ON) and non-conduction (OFF) of the switching transistors 11 included in the pixels 16, by outputting a selection signal to the gate signal lines 17.

For example, when an ON voltage is applied to the gate signal line 17a in a pixel circuit illustrated in FIG. 13 described above, the second switching transistor 11b is turned ON, and a video signal applied to the source signal line 18 is applied to the pixel 16. In addition, the gate driver ICs 12 each include a plurality of scanning and outputting buffer circuits.

The gate driver ICs 12 (gate driver ICs 12a and 12b) are disposed on the right side and the left side of the display screen 20, and each of the gate signal lines 17 is connected to at least one of the gate driver IC 12a and the gate driver IC 12b.

According to the example of the present modification illustrated in FIG. 13 and FIG. 14, each of the gate signal line 17a and the gate signal line 17b has ends to which the gate driver ICs 12a and 12b disposed on the right side and the left side of the display screen 20 are connected. The gate signal lines 17c and 17d each have an end connected to the gate driver IC 12a disposed on the left side of the display screen 20. The gate driver ICs 12 are each mounted on a COF (chip of film) which is not illustrated.

FIG. 15 is a diagram illustrating an example of a configuration of the gate driver IC included in the EL display apparatus according to the present modification. As illustrated in FIG. 15, the gate driver IC 12 includes four scanning and outputting buffer circuits 31a to 31d corresponding one to one to the gate signal lines 17. It should be noted that there are instances where the scanning and outputting buffer circuits 31a to 31d are not specifically distinguished from each other and described scanning and outputting buffer circuits 31.

The scanning and outputting buffer circuits 31 each include a shift register which specifies a position of a gate signal line to be selected (pixel row position) and an output buffer circuit which drives the selected gate signal line 17.

To specify a position of a gate signal line (pixel row position) is to specify or determine a position at which an ON voltage (selection voltage) and an OFF voltage (non-selection voltage) are to be applied to the gate signal line 17, or is the state thereof.

The four scanning and outputting buffer circuits 31 each drive a corresponding one of the four gate signal lines 17. The scanning and outputting buffer circuit 31a drives the gate signal line GR. The scanning and outputting buffer circuit 31b drives the gate signal line GI. The scanning and outputting buffer circuit 31c drives the gate signal line GE. The scanning and outputting buffer circuit 31d drives the gate signal line GS. Other points are the same or similar to those in Embodiment 1 described in FIG. 6, for example, and thus description will be omitted.

It should be understood that the driving method and the apparatus according to Embodiment 1 which have been described with reference to FIG. 4, FIG. 5, FIG. 10, FIG. 11, and FIG. 12 can be applied to the configuration according to the modification of Embodiment 1 which has been descried with reference to FIG. 13 to FIG. 15. Accordingly, description will be omitted.

Other Embodiments

It should be understood that the above-described embodiment and modification can also be applied to other embodiments according to the present disclosure. It should also be understood that it is possible to combine the above-described embodiment and modification with other embodiments.

Figure 16:
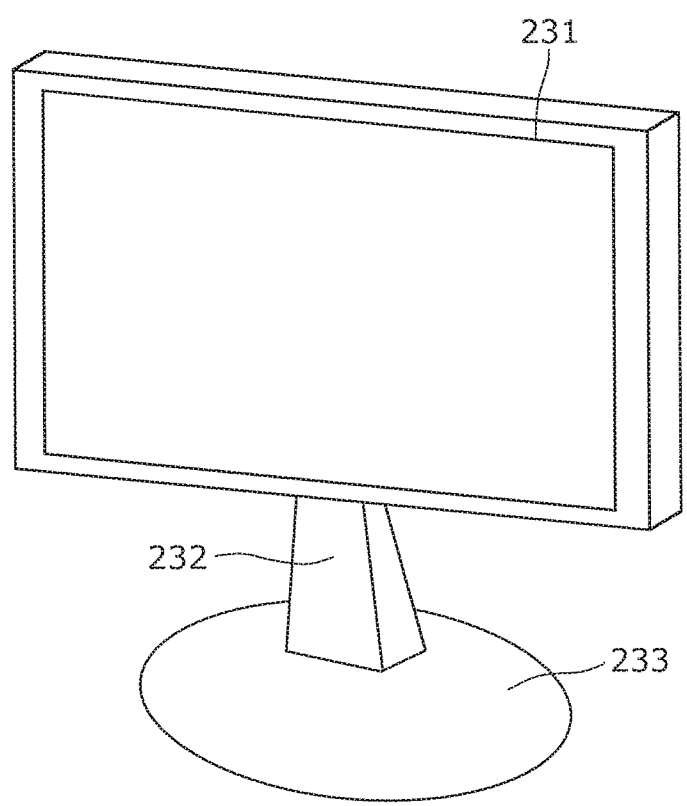
FIG. 16 illustrates an external view of a display in which the EL display apparatus according to the present disclosure is adopted.

In addition, it should be understood that the EL display apparatus (display panel) illustrated or explained in the above-described embodiment of the present disclosure can be adopted as an EL display apparatus to be adopted as a display illustrated in FIG. 16, or can be included in information devices.

The display illustrated in FIG. 16 includes an EL display apparatus (EL display panel) 231 according to the present disclosure, a support column 232 which holds the EL display apparatus 231, and a holding base 233.

In the present disclosure, each drawings has a portion which is omitted, enlarged, or reduced, for facilitating understanding or facilitating drawing of the figures.

Items or details illustrated or described in the embodiments of the present disclosure are applied to other embodiments as well. In addition, the EL display panel described or illustrated in the embodiments of the present disclosure can be adopted as the EL display apparatus of the present disclosure.

Furthermore, portions to which the same numbers or symbols are assigned have the same or similar forms, materials, functions, or operations, or related items, effects, etc.

The details described in each of the diagrams or the like can be combined with other embodiments, etc., without notification. For example, it is possible to form an information display apparatus by adding a touch panel or the like.

The EL display apparatus according to the present disclosure is a concept which includes a system device such as an information device. The concept of the EL display panel includes, in a broad sense, a system device such as an information device.

As described above, exemplary embodiments are described as exemplifications of the technique according to the present disclosure. The accompanying drawings and detailed description are provided for this purpose.

Therefore, the constituent elements described in the accompanying drawings and detailed description include, not only constituent elements essential to solving the problem, but also constituent elements that are not essential to solving the problem but are included in order to exemplify the aforementioned technique. As such, description of these non-essential constituent elements in the accompanying drawings and the detailed description should not be taken to mean that these non-essential constituent elements are essential.

Furthermore, since the foregoing embodiments are for exemplifying the technique according to the present disclosure, various changes, substitutions, additions, omissions, and so on, can be carried out within the scope of the Claims or its equivalents.

INDUSTRIAL APPLICABILITY

The present disclosure is useful especially for an active EL flat panel display, etc.

REFERENCE SIGNS LIST 1, 231 EL display apparatus
11, 11a, 11b, 11c, 11d, lie transistor (TFT)
12, 12a, 12b gate driver IC (i. e., gate driver circuit)
14 source driver IC (i. e., source driver circuit)
15 EL element
16 pixel
17, 17a, 17b, 17c, 17d, gate signal line
18 source signal line
19 capacitor
20 display screen
21 display panel
22a, 22b, 22c COF
23a, 23b, 23c printed circuit board
31, 31a, 31b, 31c, 31d, scanning and outputting buffer circuit
32 input terminal
34 output terminal
61a and 61b gate driver output equivalent circuit
62 panel equivalent circuit
94a, 94b STV signal
95 TCON
96a, 96b output signal
232 support column
233 holding base

The invention claimed is:

1. An electroluminescence (EL) display apparatus of an active matrix type which includes a display screen in which pixels are disposed in a matrix, the EL display apparatus comprising;
    a source driver circuit configured to output a video signal to be applied to the pixels;
    a source signal line configured to transmit the video signal output by the source driver circuit;
    a gate driver circuit; and
    a first gate signal line and a second gate signal line, each being configured to transmit a selection voltage for placing a pixel from the pixels in a selection state, and a non-selection voltage for placing a pixel from the pixels in a non-selection state,
    wherein the pixels each include:
        a driving transistor;
        an EL element;

a first switching transistor disposed in a pathway of current which flows through the EL element; and a second switching transistor configured to apply the video signal to the driving transistor, the gate driver circuit includes:

a first scanning circuit; and a second scanning circuit, the first gate signal line is connected to a gate terminal of the first switching transistor, the second gate signal line is connected to a gate terminal of the second switching transistor, the EL display apparatus further comprises:

a control circuit configured to exchange a signal with the gate driver circuit and the source driver circuit, the first scanning circuit and the second scanning circuit are connected to the control circuit, and an output signal of each of the first scanning circuit and the second scanning circuit is inputted to the control circuit, and the control circuit compares the output signals of the first scanning circuit and the second scanning circuit to determine a time difference between the output signals, when the time difference between the output signals is determined to be greater than a predetermined value, the control circuit outputs a control signal to stop the gate driver circuit, and when the time difference between the output signals is determined to be less than or equal to the predetermined value, the control circuit adjusts a timing of at least one of the inputted output signals to remove the time difference.

2. The EL display apparatus according to claim 1, wherein the control circuit deactivates the first scanning circuit and the second scanning circuit when the output signal of the first scanning circuit and the output signal of the second scanning circuit are at a high level or at a low level for a specified period of time.

3. The EL display apparatus according to claim 1, wherein the control circuit detects the output signal of the first scanning circuit and the output signal of the second scanning circuit at least twice in one frame period.

4. An electroluminescence (EL) display apparatus of an active matrix type which includes a display screen in which pixels are disposed in a matrix, the EL display apparatus comprising;

a source driver circuit configured to output a video signal to be applied to the pixels;

a source signal line configured to transmit the video signal output by the source driver circuit;

a first gate driver circuit;

a second gate driver circuit; and a gate signal line configured to transmit a selection voltage for placing a pixel from the pixels in a selection state, and a non-selection voltage for placing a pixel from the pixels in a non-selection state, wherein the first gate driver circuit and the second gate driver circuit each include:

a data input terminal, and a data output terminal, the pixels each include:

an EL element;

a driving transistor configured to supply a current to the EL element; and a switching transistor disposed in a pathway of the current, the gate signal line is connected to a gate terminal of the switching transistor, the gate signal line has one end connected to the data output terminal of the first gate driver circuit, and another end connected to the data output terminal of the second gate driver circuit, each of the first gate driver circuit and the second gate driver circuit outputs an output signal to a control circuit, the control circuit compares output signals of the first gate driver circuit and the second gate driver circuit to determine a time difference between the output signals, when the time difference between the output signals is determined to be less than or equal to a predetermined value the control circuit outputs a control pulse, when the time difference between the output signals is determined to be greater than the predetermined value, the control circuit outputs a signal to stop the first gate driver circuit and the second gate driver circuit, when the control pulse is output from the control circuit:

the control pulse is inputted to the data input terminal, sequentially shifted in each of the first gate driver circuit and the second gate driver circuit, and output from the data output terminal, the selection voltage is output to the gate signal line when the control pulse has a first polarity, the non-selection voltage is output to the gate signal line when the control pulse has a second polarity, the current is supplied to the EL element as a result of applying the selection voltage to the gate signal line, and is interrupted as a result of applying the non-selection voltage to the gate signal line, the control pulse having the first polarity and the control pulse having the second polarity form paired control pulses, and the paired control pulses are inputted contemporaneously to the data input terminal of the first gate driver circuit and the data input terminal of the second gate driver circuit, at least twice in a period in which the first gate driver circuit and the second gate driver circuit each scan the display screen once.

\* \* \* \* \*